(12) United States Patent
Mercer

(10) Patent No.: US 7,752,548 B2
(45) Date of Patent: Jul. 6, 2010

(54) FEATURES SUCH AS TITLES, TRANSITIONS, AND/OR EFFECTS WHICH VARY ACCORDING TO POSITIONS

(75) Inventor: Ian Cameron Mercer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1541 days.

(21) Appl. No.: 10/976,833

(22) Filed: Oct. 29, 2004

(65) Prior Publication Data

US 2006/0092295 A1 May 4, 2006

(51) Int. Cl.
*G06F 3/00* (2006.01)
(52) U.S. Cl. .................. 715/731; 715/202; 715/204; 715/732
(58) Field of Classification Search ............... 715/202, 715/204, 731, 732
See application file for complete search history.

(56) References Cited

U.S. PATENT DOCUMENTS

| | | | |
|---|---|---|---|
| 5,148,154 A | | 9/1992 | MacKay et al. |
| 5,353,391 A | * | 10/1994 | Cohen et al. ................ 345/619 |
| 5,513,306 A | | 4/1996 | Mills et al. |
| 5,706,417 A | | 1/1998 | Adelson |
| 5,859,623 A | * | 1/1999 | Meyn et al. ................. 715/730 |
| 5,926,603 A | | 7/1999 | Tanaka et al. |
| 5,929,857 A | | 7/1999 | Dinallo et al. |
| 5,929,867 A | | 7/1999 | Herbstman et al. |
| 5,999,173 A | | 12/1999 | Ubillos |
| 6,028,603 A | | 2/2000 | Wang et al. |
| 6,072,480 A | * | 6/2000 | Gorbet et al. ............... 715/730 |
| 6,097,389 A | | 8/2000 | Morris et al. |
| 6,204,840 B1 | | 3/2001 | Petelycky et al. |
| 6,351,765 B1 | | 2/2002 | Pietropaolo et al. |
| 6,369,835 B1 | * | 4/2002 | Lin ............................ 715/726 |

(Continued)

FOREIGN PATENT DOCUMENTS

JP 05290548 A 11/1993

(Continued)

OTHER PUBLICATIONS

Wikipedia, "Windows Movie Maker", http://en.wikipedia.org/wiki/Windows_Movie_Maker, saved printout pp. 1-18 on Feb. 28, 2008.

(Continued)

*Primary Examiner*—William L Bashore
*Assistant Examiner*—Gregory A Distefano
(74) *Attorney, Agent, or Firm*—Senniger Powers LLP

(57) ABSTRACT

A software program for creating features for use with a plurality of media objects in a sequence. The program comprises a feature component specifying a feature having parameters affecting at least one variable aspect of the feature. An indicator component identifies a position of the specified feature relative to the media objects in the sequence. The program comprises a sequence generator for modifying the specified feature by varying its parameters of the specified feature as a function of the position of the specified feature relative to the media objects and/or relative to other features in the sequence. The sequence generator also modifies the specified feature by varying its parameters of the feature as a function of the content of the media objects around it or to which it has been applied. A rendering component renders the specified feature according to the varied parameters at the identified position.

35 Claims, 14 Drawing Sheets

U.S. PATENT DOCUMENTS

| | | |
|---|---|---|
| 6,404,978 B1 | 6/2002 | Abe |
| 6,424,789 B1 | 7/2002 | Abdel-Mottaleb |
| 6,430,355 B1 | 8/2002 | Nagasawa |
| 6,469,723 B1 | 10/2002 | Gould et al. |
| 6,546,188 B1 | 4/2003 | Ishii et al. |
| 6,597,859 B1 | 7/2003 | Leinhart et al. |
| 6,628,303 B1 | 9/2003 | Foreman et al. |
| 6,674,955 B2 * | 1/2004 | Matsui et al. ............ 386/52 |
| 6,714,216 B2 | 3/2004 | Abe |
| 6,721,361 B1 | 4/2004 | Covell et al. |
| 6,807,306 B1 | 10/2004 | Girgensohn et al. |
| 6,813,313 B2 | 11/2004 | Xu et al. |
| 6,856,997 B2 | 2/2005 | Lee et al. |
| 6,928,613 B1 | 8/2005 | Ishii et al. |
| 7,016,540 B1 | 3/2006 | Gong et al. |
| 7,027,509 B2 | 4/2006 | Jun et al. |
| 7,042,464 B1 | 5/2006 | Paquette |
| 7,117,453 B2 | 10/2006 | Drucker et al. |
| 7,149,974 B2 | 12/2006 | Girgensohn et al. |
| 7,203,380 B2 | 4/2007 | Chiu et al. |
| 7,222,300 B2 | 5/2007 | Toyama et al. |
| 7,334,191 B1 | 2/2008 | Sivan et al. |
| 7,398,004 B1 | 7/2008 | Maffezzoni et al. |
| 2001/0035875 A1 | 11/2001 | Suzuki et al. |
| 2001/0041020 A1 | 11/2001 | Shaffer et al. |
| 2002/0118302 A1 | 8/2002 | Iizuka et al. |
| 2002/0122067 A1 | 9/2002 | Geigel et al. |
| 2002/0138619 A1 | 9/2002 | Ramaley et al. |
| 2002/0167541 A1 | 11/2002 | Ando et al. |
| 2003/0002851 A1 | 1/2003 | Hsiao et al. |
| 2003/0052909 A1 | 3/2003 | Mo et al. |
| 2003/0063125 A1 | 4/2003 | Miyajima et al. |
| 2003/0086686 A1 | 5/2003 | Matsui et al. |
| 2003/0090506 A1 * | 5/2003 | Moore et al. ............ 345/730 |
| 2003/0103074 A1 | 6/2003 | Jasinschi |
| 2003/0146915 A1 | 8/2003 | Brook et al. |
| 2003/0164845 A1 | 9/2003 | Fayan et al. |
| 2003/0190143 A1 | 10/2003 | Girgensohn et al. |
| 2003/0192049 A1 | 10/2003 | Schneider et al. |
| 2003/0227493 A1 | 12/2003 | Yokomizo |
| 2003/0237091 A1 | 12/2003 | Toyama et al. |
| 2004/0004626 A1 | 1/2004 | Ida et al. |
| 2004/0049419 A1 | 3/2004 | Knight |
| 2005/0053356 A1 | 3/2005 | Mate et al. |
| 2005/0071774 A1 | 3/2005 | Lipsky et al. |
| 2005/0081159 A1 | 4/2005 | Gupta et al. |
| 2005/0249080 A1 | 11/2005 | Foote et al. |
| 2005/0257151 A1 | 11/2005 | Wu |
| 2006/0059426 A1 | 3/2006 | Ogikubo |
| 2006/0288288 A1 | 12/2006 | Girgensohn et al. |
| 2008/0034325 A1 | 2/2008 | Ording |

FOREIGN PATENT DOCUMENTS

| | | |
|---|---|---|
| JP | 200256651 A | 2/2002 |
| JP | 2002042425 A | 2/2002 |
| WO | 0115169 A1 | 3/2001 |

OTHER PUBLICATIONS

Microsoft, "Adding Video Effects to Your Movies with Windows Movie Maker 2", Nov. 13, 2003, http://www.microsoft.com/windowsxp/using/moviemaker/learnmore/addingeffects.mspx, printout pp. 1-3.

* cited by examiner

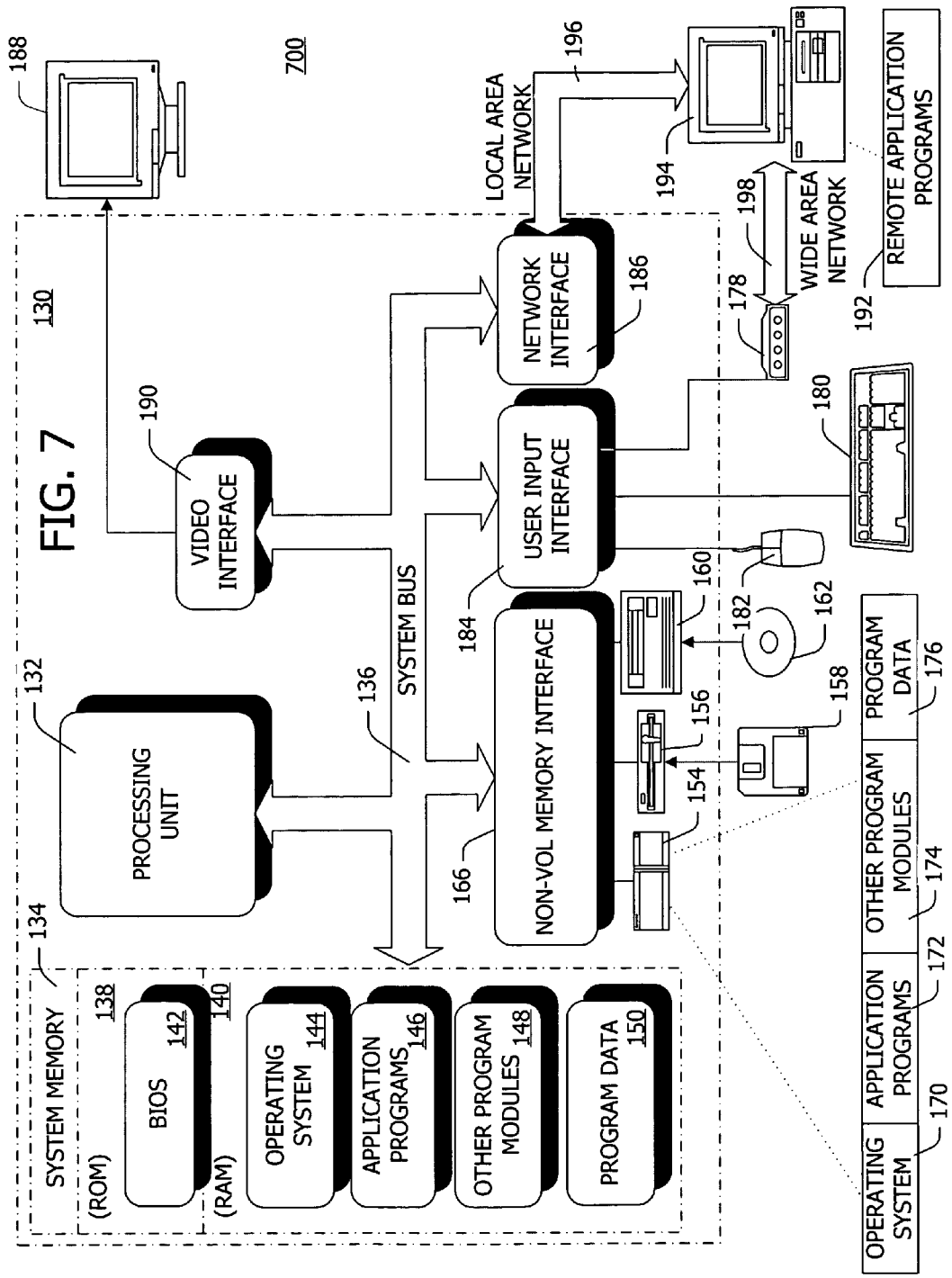

FEATURES SUCH AS TITLES, TRANSITIONS, AND/OR EFFECTS WHICH VARY ACCORDING TO POSITIONS

TECHNICAL FIELD

Embodiments of the present invention relate to the field of editing of multimedia objects. In particular, embodiments of this invention relate to dynamically executing features such as titles, effects, and/or transitions to media objects in a sequence, based on the feature's position relative to the media objects in the sequence, and/or based on the feature's position relative to other features, and/or based on analysis of the content of the media objects themselves.

BACKGROUND OF THE INVENTION

With the popularity and advancement in digital imaging, consumers may now create and edit digital multimedia objects by using known commercially available multimedia editing software products. For example, a consumer may use an image-capturing device, such as a digital camcorder or a digital camera, to record or capture events, such as a wedding or a vacation. With the help of a multimedia editing software product, the consumer inputs the recorded events to a computing device having multimedia editing software. The multimedia editing software includes a timeline on which the consumer arranges the recorded events. The consumer chooses which events to include on the timeline, the order those events are shown and the extent or duration of each event. The consumer may choose a number of options or features to add to the recorded events on the timeline. For example, the consumer may insert an overlay title on an individual video clip, image, or other media object, or on a group or sequence of video clips, images or other media objects. The consumer may also create titles that are themselves media objects on the timeline independent of any other media object. The consumer may also apply effects to a video clip, image or other media object on the timeline. For example, the consumer may apply effects that change the underlying media object to black and white or to a sepia tone; change the brightness, contrast or hue; rotate the image or cause images or media objects to fade in or out over time. Other effects may also change the audio belonging to an underlying media object; for example, to make it louder or softer or to add an echo. The consumer may also add transitions between clips, images, or other media objects. Transitions typically combine two media objects to create an image that blends the images from each media object changing during the duration of the transition, for example, fading from one media object to the other.

In the case of a number of video clips, images, or other media objects in a timeline sequence, a consumer may apply interesting sequences of titles, effects, transitions, or other features to the media objects using existing multimedia object editing software products. For example, a consumer can apply a feature such as a wipe transition to a series of video clips according to a particular pattern. In particular, the consumer may desire the following feature pattern sequence: a left-to-right wipe between the first two video clips, a right-to-left wipe between the second and third video clips, a top-down wipe between the third and fourth video clips, a bottom-up wipe between the fourth and fifth video clips, and so on, repeating this pattern of four transitions along the timeline. To achieve this pattern, the consumer may repeat applying the features to maintain the pattern as he or she continues editing the media objects and/or applying other features. After completing editing of the media objects, the consumer may output the edited media objects to a display or record them on a computer-readable medium, such as a DVD.

Over time, this process of applying a transition or other features to the entire series of video clips to maintain the feature pattern becomes overwhelming as one modifies and edits the media objects. For example, a consumer may need to adjust all transitions, effects, titles, or other features that he or she wants whenever there is a subsequent change to the order of media objects or features in a sequence. In addition, it may be tedious and laborious to choose different transitions or effects and apply them to or between media objects on the timeline to achieve the pattern one wants. Also, when a consumer inserts or deletes a media object in a sequence, the order of previously or subsequently added transitions, effects, titles, or other features may change. As an illustration using the above example where a right-to-left wipe is to appear between the second and third video clips, if the second video clip is removed or a new video clip is inserted after the second video clip, the consumer would need to rearrange all wipe transitions after the third video clip to maintain the same wipe transition pattern.

There is a need for multimedia editing software products that have the ability to dynamically apply transitions, effects, titles, or other features to media objects during editing of media objects in a sequence based on position. There is also a need for multimedia editing software which assists a consumer to track features and maintain feature characteristics (e.g., wipe or fade transition patterns) while editing and/or re-ordering media objects.

Accordingly, a system and method for features such as titles, transitions, effects, and other features is desired to address one or more of these and other needs.

SUMMARY OF THE INVENTION

Embodiments of the invention include an application to modify the various aspects or properties of features (e.g., effects, transitions, or title styles) as a function of a position of the features relative to media objects and/or other features in a sequence. The application uses one or more parameters incorporated in the features to generate appropriate aspects of the features without requiring a consumer to track the position of the features while editing media objects. Embodiments of the invention also include a data structure for including data representing parameters such as local sequence values, global sequence values (including sequence number and overall count) for an individual type or instance of features or for a family of features (e.g., all effects that look like an explosion might be part of a family of effects). Embodiments of the invention also include an application to modify the various aspects or properties of the features as a function of the media objects around them and/or other features in a sequence.

According to one aspect of the invention, a software program creates features for use with a plurality of media objects in a sequence. A feature component specifies a feature having parameters, which affect at least one variable aspect of the feature. An indicator component identifies a position of the specified feature relative to the media objects in the sequence. A sequence generator for modifying the specified feature by varying its parameters as a function of the position of the specified feature within the sequence. A rendering component renders the specified feature according to the varied parameters of the specified feature at the identified position when the media objects are sequentially displayed.

In accordance with another aspect of the invention, a computer-readable medium has computer-executable components for applying one or more features to a plurality of media objects in a sequence. Each of the features has parameters that affect at least one variable property of the feature. An indicator component identifies a specified one of the features in a position in the sequence of the plurality of media objects. A modification component modifies the specified feature by varying its parameters as a function of the position of the feature within the sequence.

According to yet another aspect, the invention is a method for creating features for use with a plurality of media objects in a sequence. A feature having parameters affecting at least one variable aspect of the feature is specified. The position of the specified feature relative to the media objects in the sequence is identified. The specified feature is modified by varying its parameters as a function of the position of the specified feature within the sequence. The specified feature is rendered according to the varied parameters of the specified feature at the identified position when the media objects are sequentially displayed.

In accordance with a further aspect of the invention, a computer-readable medium stores a data structure for a feature to be associated with one or more of a plurality of media objects in a sequence. A first field includes data identifying the feature. A second field stores a value representing a position of the feature relative to at least one other feature associated with the media objects in the sequence. The position of the feature is determined as a function of the first field.

According to yet another aspect, a software program creates features for use with a plurality of media objects in a sequence. A feature component specifies a feature having parameters which affect at least one variable aspect of the feature. An indicator component identifies a position of the specified feature relative to the media objects in the sequence. A sequence generator modifies the specified feature by varying its parameters as a function of the content of the plurality of media objects within the sequence. A rendering component renders the specified feature according to the varied parameters of the specified feature at the identified position when the media objects are sequentially displayed.

Alternatively, the invention may comprise various other methods and apparatuses.

Other features will be in part apparent and in part pointed out hereinafter.

BRIEF DESCRIPTION OF THE DRAWINGS

FIG. 7 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1A:
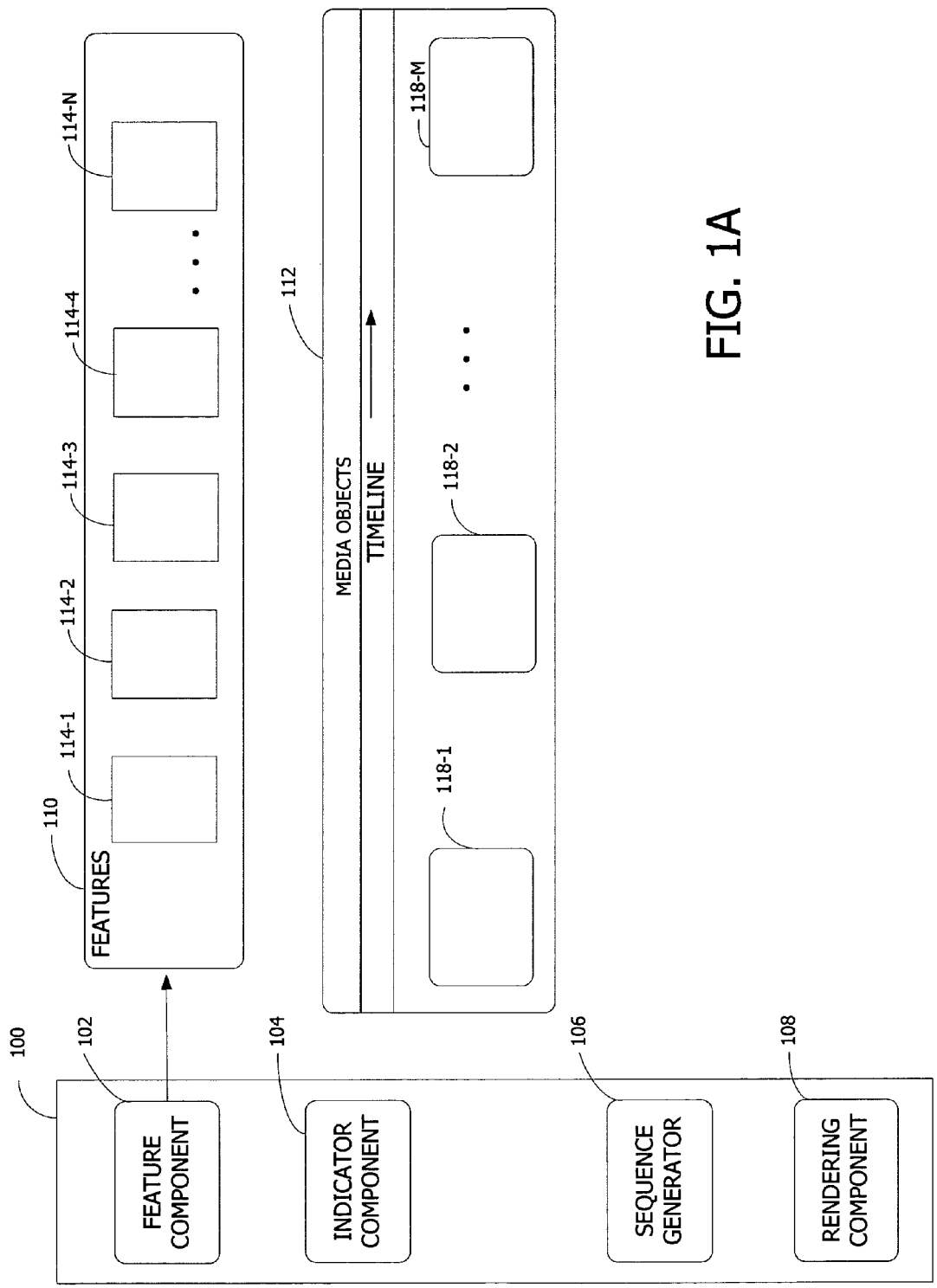
FIGS. 1A to 1D are block diagrams illustrating a system and method for applying one or more features in a plurality of media objects in a sequence according to the invention.

Referring first to FIGS. 1A to 1D, block diagrams illustrate a system 100 which is part of multimedia editing software for implementing one or more features 114 with a plurality of media objects 118 in a sequence according to the invention. The system 100 may be a software program, an application, and a set of computer-executable instructions to be installed or implemented in a computing device, such as a computer 130 in FIG. 7. The system 100 is capable of editing media objects and/or creating interesting results to media objects by applying a feature to one or more media objects, such as 118-1 to 118-M. In one embodiment, a media object 118 may be a video clip, an image, a slide presentation, a visual graphical composition, an audio composition, a visual/audio representation, or the like. The media object 118 may also be a file, an electronic compilation of files, a collection of files of visual and/or audio compositions, an electronic document, or the like. Feature 114 may be a transition applied between media objects 118 to create a transition from one media object to the next consecutive media object, an overlay-title to be placed over a media object 118, a title to be placed before or after a media object 118, an effect to be applied to a media object 118, a blank or colored screen between media objects 118, or other features 114 that may modify a composition of media objects 118. By way of example and not limitation, a feature such as a title or transition may be applied between two consecutive media objects (e.g., a wipe, a fade or other transitions). In another example of a feature, an effect may be applied to a single media object (e.g., modifying black and white, sepia, color balance, or the like). In another example of a feature, a title may be placed at the beginning of a sequence of media objects to introduce them, at the end of a sequence of media objects as in, for example, credits on a movie, or on top of one or more media objects as in, for example, subtitles on a movie.

Initially, one or more features, such as 114-1, 114-2 to 114-N, having parameters which affect at least one variable aspect or property of the feature. Such features are available to a consumer or other user of the system 100. The variable aspect or property controls a presentation of the feature. By varying the feature's parameters, the aspect or property of the features is changed. For example, a feature such as a wipe transition includes at least variable aspects or properties, such as a directional aspect of a wipe (e.g., left-to-right, right-to-left, or the like), a shape aspect of a wipe (e.g., smooth edge shape, zigzag edge shape, or the like), a velocity aspect of a wipe (e.g., fast speed wipe, slow speed wipe, or the like). In another example, a feature such as a title includes variable aspects or properties such as a color aspect of title (e.g., a red color title, a blue color title, or the like), a font aspect of title (e.g., font size, font type, font color, or the like). In other example, a feature such as a hue-shift effect includes variable aspects or properties such the color to which the hue should be shifted and the degree to which it should be shifted towards that color. The features 114 may be included as part of the system 100. In another embodiment, a third party supplies and designs the features 114 to be incorporated with the system 100. Also, a sequence 112 of media objects 118 may be supplied to the system 100 in the form of files supplied by an input device, such as a digital camera or a digital camcorder.

Figure 1B:
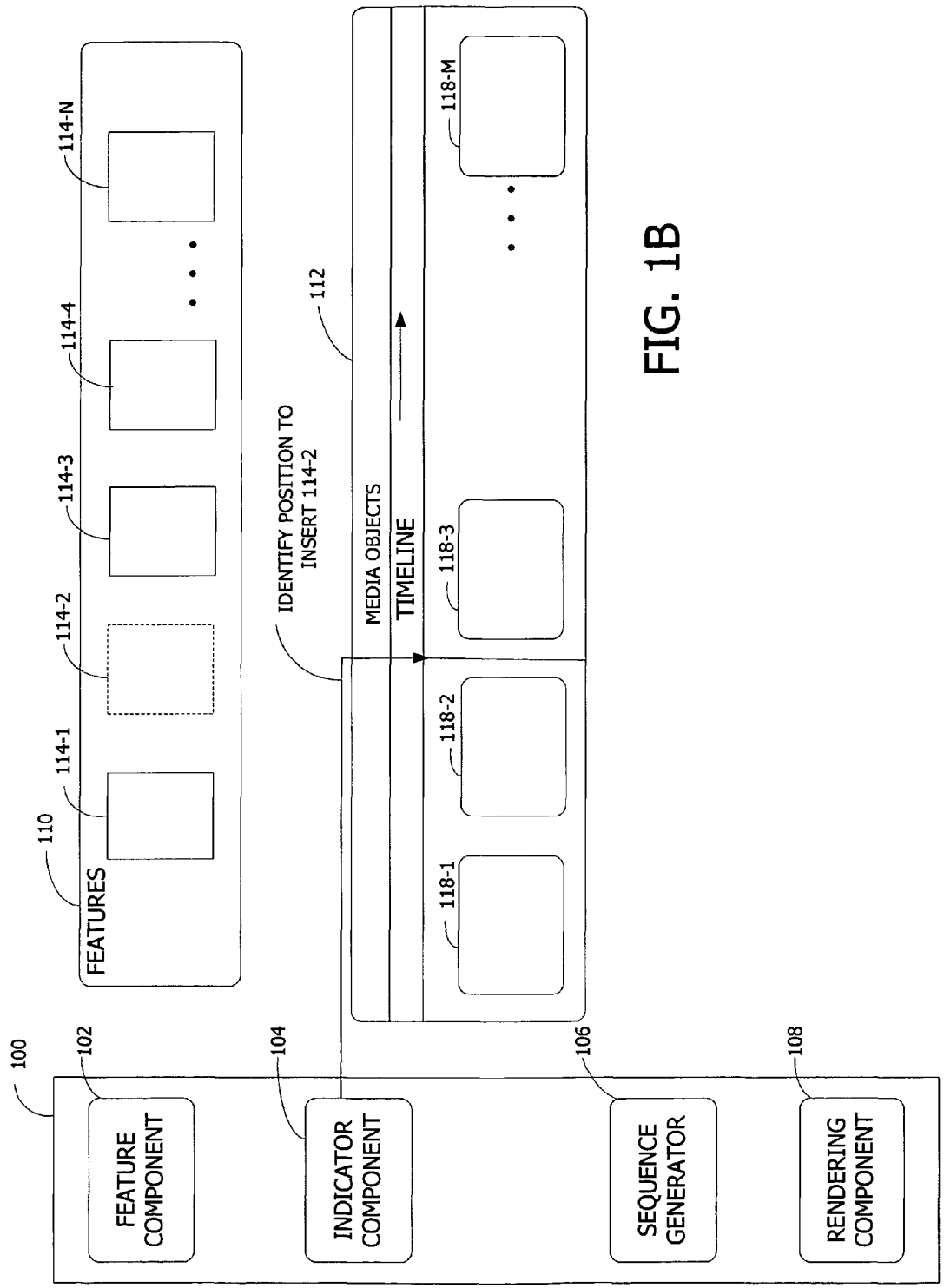

In FIG. 1A, the system 100 includes a feature component 102 for specifying a feature, such as the feature 114-1, having parameters which affect at least one aspect which is variable. In FIG. 1B, the consumer uses an indicator component 104 to identify a position of one of the features, e.g., 114-2, relative to the media objects 118 in the sequence 112. This can be accomplished, for example, by using a mouse to drag and drop the feature 114-2. The indicator component 104 identifies the position in the sequence 112 to place the feature 114-2, such as a transition or a title, between the media object 118-1 and the media object 118-2. In the case of a feature such as a transition or title, the user uses the indicator component 104 to identify the position occupied by the media object or objects, such as the position between media object 118-1, 118-2, and 118-3 to which the feature will apply. In the case of an effect, the consumer uses the indicator component 104 to identify a position of the media object for the specified feature.

The consumer may continue to use the indicator component 104 to identify other positions in the sequence 112 for the specified features 114. For example, in FIG. 1C, the consumer uses the indicator component 104 to identify a position between the media objects 118-1 and 118-2 in the sequence 112 for the feature 114-1. The consumer may also use the indicator component 104 to specify another instance of the feature 114-1 in a position between media objects 118-3 and 118-4.

Figure 1C:
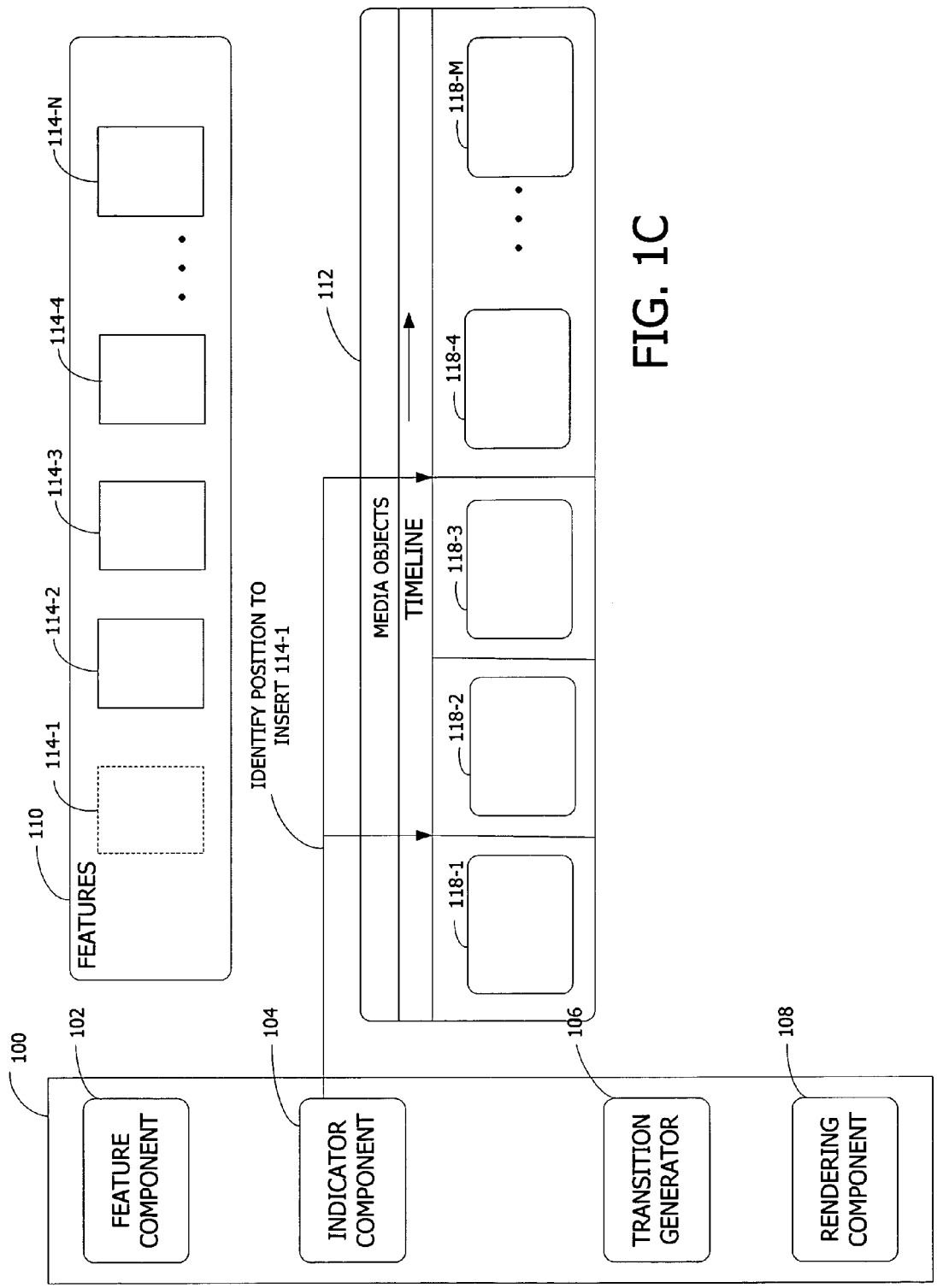
Figure 1D:
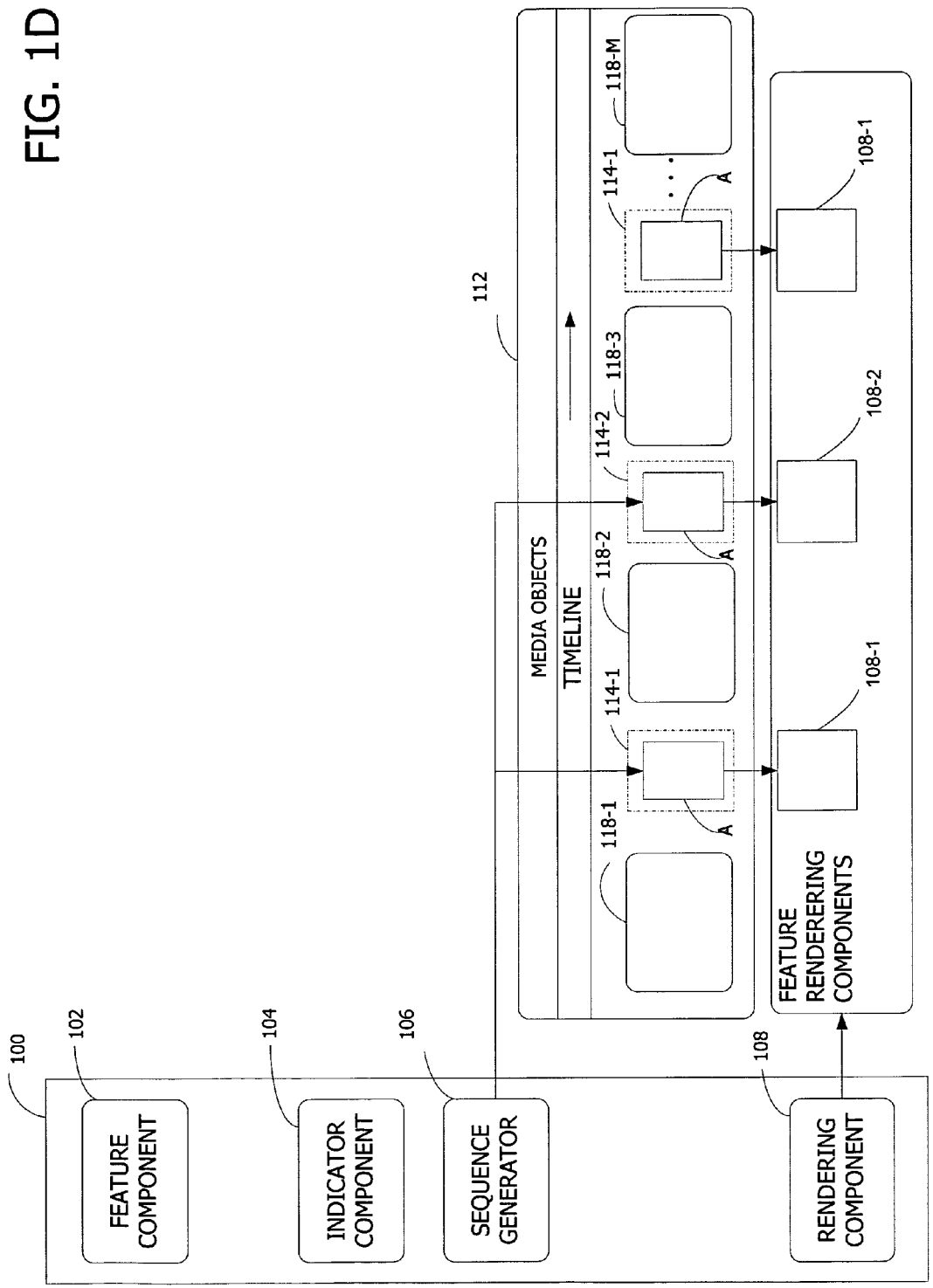

The system 100 also comprises a sequence generator 106 or a modification component for modifying the features 114 by varying its parameters to vary at least one aspect A, shown by a box inside feature 114-1 or 114-2 in FIG. 1D. For example, the feature 114-2 may be a wipe transition having directional aspects, such as left-to-right, right-to-left, top-down, bottom-up, or the like. The feature 114-1 may be a title feature having color aspects such as blue, red, green, yellow, or the like. The sequence generator 106 modifies the sequence data for features 114-1 and 114-2 and/or other features 114 that are present in the sequence 112. The sequence generator 106 modifies the features 114-1 and 114-2 by varying the parameters of the feature 114-1 as a function of the position of the feature within the sequence 112. In particular, the aspect A may be modified as a function of the position of the feature relative to the media objects in the sequence 112 or relative to other features in the sequence 112 (to be discussed in detail in FIGS. 5A to 5D).

It is contemplated that the consumer does not necessarily see the modification performed by the sequence generator 106 on a display when the features are positioned with the sequence. In other words, the system 100 is configured or designed to operate such that the consumer specifies the features and identifies the positions of the specified features and the system 100 executes the features with varying aspects where the sequence 112 is displayed.

The system 100 also includes a rendering component 108 for rendering the features according to its varied parameters at the identified position when the media objects are sequentially displayed. Each specific feature type has its own feature rendering component shown as 108-1 and 108-2 in FIG. 1D. The feature rendering component 108-1 renders the feature 114-1 according to the aspect A of the feature that has been set by the sequence generator 106. For example, after the sequence generator 106 modifies the aspect A of a feature 114-1 to indicate that it is now third in a sequence of identical features instead of second, the rendering component 118-1 may render a right-to-left wipe instead of a top-to-bottom wipe in the identified position.

In one embodiment, the system 100 displays the modified features in real time. For example, after the consumer specifies the feature(s) and identifies the position(s) for the feature(s) in the timeline, the sequence generator 106 modifies the aspects of the specified feature(s) immediately and the rendering component 108 renders the feature(s) in the identified position in the sequence. This modification and rendering occurs in real time as the media objects are streamed for display. In another embodiment, the system 100 does not begin playback of the timeline until it has completed rendering all of the features that have had their aspect A changed by the sequence generator 106. For example, the consumer may specify a complex feature, such as a 3-D transition, to be inserted in a position in the timeline sequence. As a 3-D transition may require additional processing, the rendering component would begin rendering the feature as soon as the sequence generator 106 has updated its aspect information, but would not allow playback of the timeline to begin until it had finished rendering the complex 3-D transition. In yet another embodiment, a proxy for the complex feature is substituted in the playback of the timeline (such as a static image explaining to the user that the feature is still being rendered) until such time as the rendering component has completed rendering all the features present on the timeline.

Figure 2:
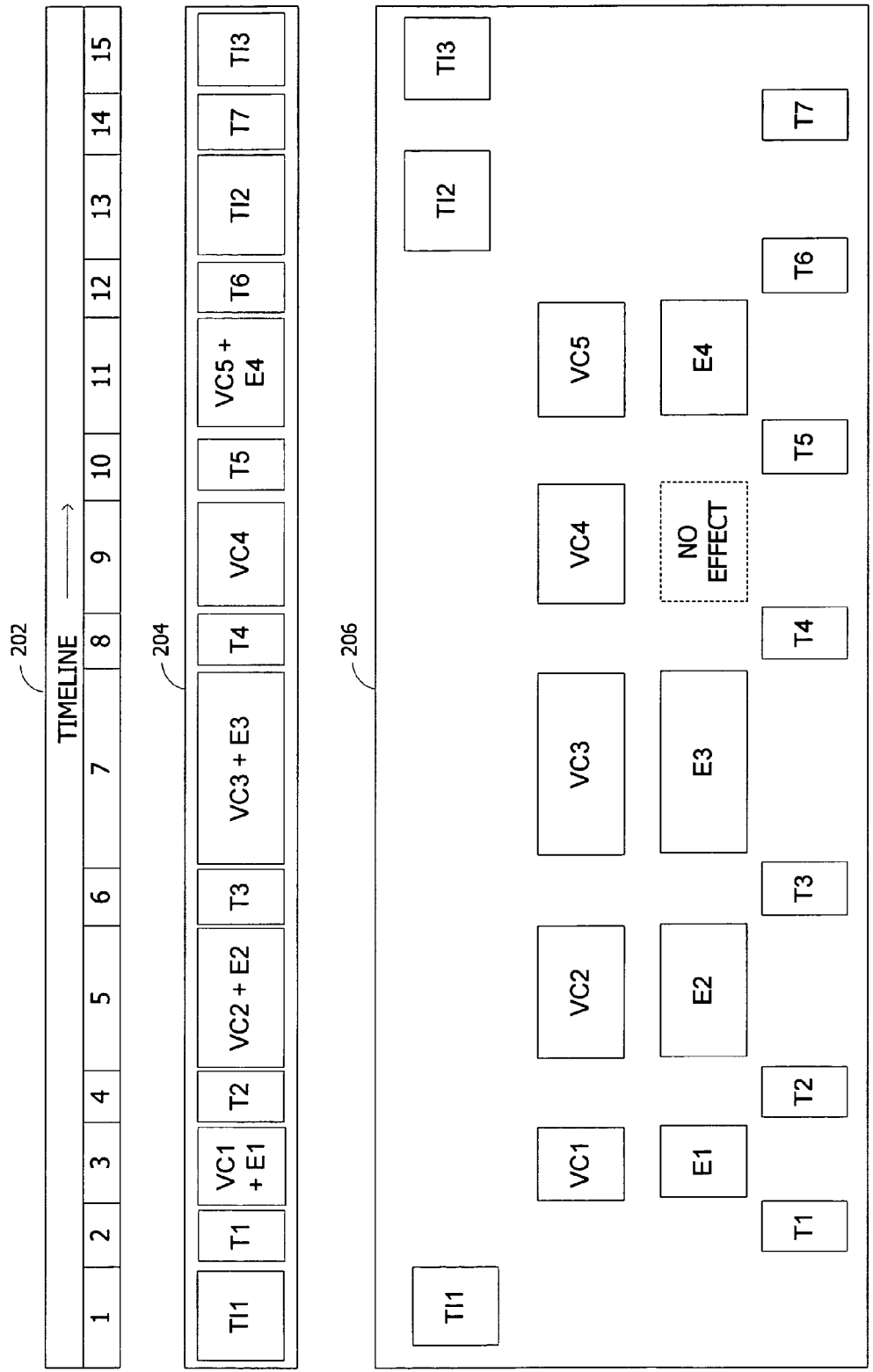
FIG. 2 is an exemplary block diagram illustrating one or more media objects with one or more modified features in the sequence according to the invention.

Referring now to FIG. 2, an exemplary diagram illustrates one or more media objects with one or more modified features in a timeline. A timeline 202 identifies media objects and modified features according to their positions, such as 1 to 15. A sequence 204 is an example of a displayed sequence showing modified features and media objects. The sequence 204 includes one or more modified features, in which TI refers to a title feature (e.g., TI1 refers to title 1), in which E refers to an effect feature (e.g., E2 refers to effect 2) and in which T refers to a transition feature (e.g., T3 refers to transition 3). The sequence 204 also includes one or more media objects, in which VC refers to a video clip (e.g., VC4 refers to video clip 4). A collection 206 of modified features and media objects illustrates a decomposition of the timeline into its constituent elements.

As discussed earlier, the consumer may continue to edit the modified features and/or media objects in the sequence 204. For example, the consumer may select a wipe transition (T) designed to generate a pattern of wipes (left-to-right, right-to-left, top-down) automatically. When the user places this wipe transition on the timeline, the sequence generator 106 modifies the aspect of each instance of that wipe transition present on the timeline and the aspect of all other transitions present on the timeline to indicate their new relative positions on the timeline. The rendering component 108 then uses this modified aspect data to generate the appropriate wipe transition for each instance of the wipe transition according to the pattern (left-to-right, right-to-left and top-down). Hence, as displayed in the sequence 204, T1 is a left-to-right wipe, T2 is a right-to-left wipe, T3 is a top-down wipe, T4 is a left-to-right wipe, T5 is a right-to-left wipe, T6 is a top-down wipe, and T7 is a left-to-right wipe. Thereafter, the consumer may remove VC4 and T5 (in positions 9 and 10 respectively) from the sequence 204. In some of the existing multimedia editing software, the consumer needs to modify wipe transitions T6 and T7 to maintain the same wipe transition pattern, (i.e., left-to-right, right-to-left and top-down). According to one advantage of the invention, on the other hand, the system 100 dynamically modifies transitions T6 and T7 after the removal of VC4 and T5 such that the consumer does not need to modify T6 and T7. In other words, the system 100 modifies the features according to the positions of the features relative to the media objects and/or other features in the sequence, such as the sequence 204.

Another example of how the system 100 modifies the features according to the positions of the features relative to other features in the sequence is as follows. Suppose the consumer specifies an automatic title feature (TI) that generates a title that looks like the front of a book, a title that looks like the back cover of a book and one or more automatically numbered chapter titles between the front cover title and the back cover title. As such, in the sequence 204, TI1 would show a front cover title, TI2 would show "Chapter 1" title and TI3 would show a back cover title. Under some of the existing multimedia software, the consumer would need to use three different title styles to achieve this effect on the timeline, and if the consumer wants to insert another chapter title after position 3 on the timeline (e.g., between VC1 and T2) while maintaining the same title pattern, the consumer needs to insert a new "chapter 1" title after position 3 and they need to modify TI2 to "chapter 2." According to another advantage of the invention, the system 100 modifies TI2 in response to a newly inserted title feature at position 3 because the system 100 modifies features according to positions of the features relative to other features in the sequence by using one or more parameter values included in the features.

By way of example and not limitation, a value in one or more of the following parameter categories may be stored in a data structure (to be discussed in detail in FIG. 4) of the feature:

a family local sequence number indicating the position of this feature within an uninterrupted sequence of features having the same family number and various type numbers;

a family global sequence number indicating the position of this feature within all features having the same family number and various type numbers;

an individual local sequence number indicating the position of this feature within an uninterrupted sequence of features having the same family number and the same type number;

an individual global sequence number indicating the position of this feature within all features having the same family number and the same type number;

a family local total count indicating the highest family local sequence number within an uninterrupted sequence of features having the same family number and various type numbers;

a family global total count indicating the highest family global sequence number within all features having the same family number and various type numbers;

an individual local total count indicating the highest individual local sequence number within an uninterrupted sequence of features having the same family number and the same type number; and/or an individual global total count indicating the highest individual global sequence number within all features having the same family number and the same type number.

It is contemplated that each feature will only use a small number of these eight parameters and that in some instances the system 100 might not implement all eight parameters listed above, and any addition to the list of parameters listed does not depart from the spirit of the invention.

Figure 3A:
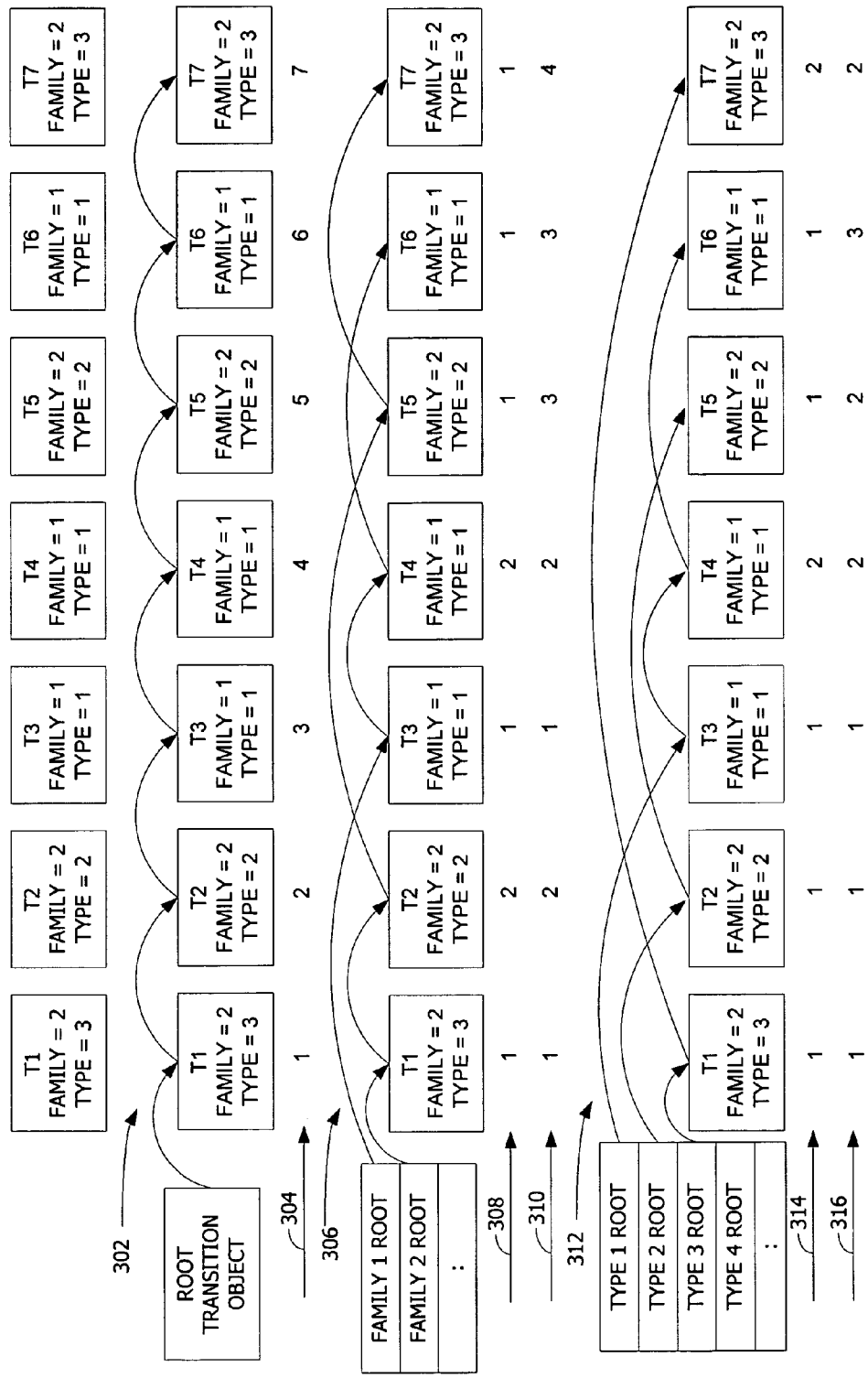
FIGS. 3A to 3C are diagrams illustrating one type of features with associated parameter values according to the invention.
Figure 3B:
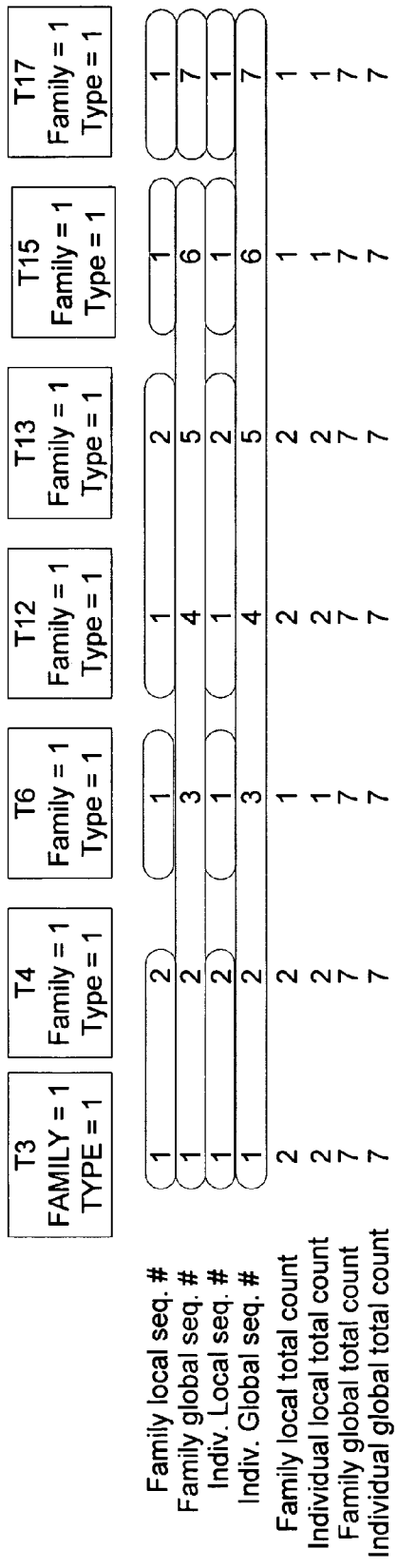
Figure 3C:
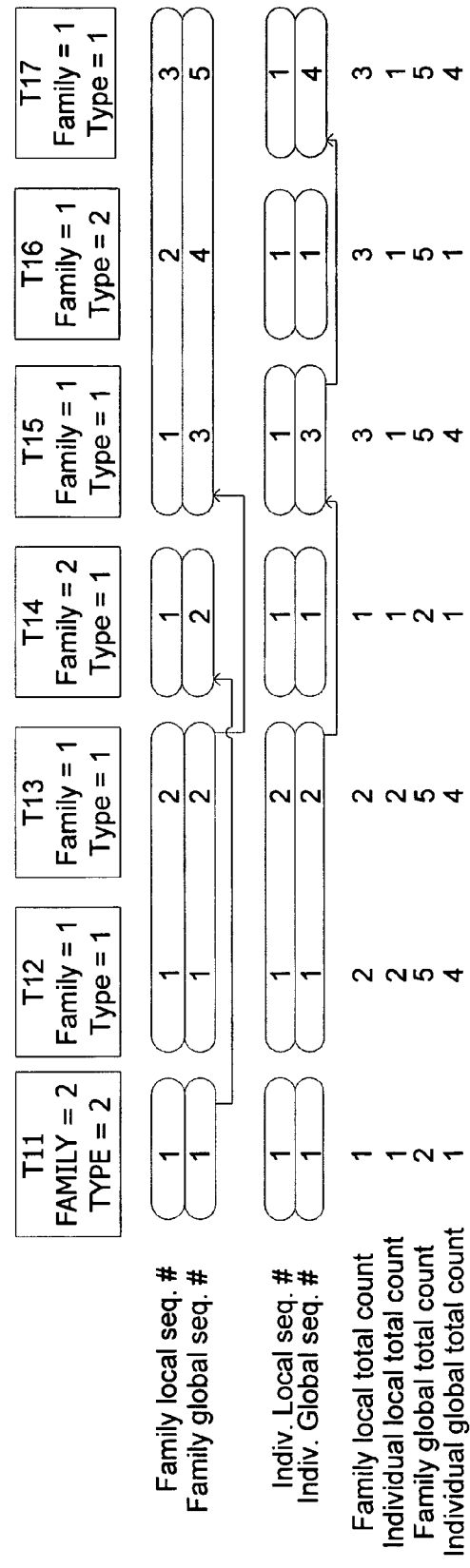

FIGS. 3A to 3C illustrate diagrams of features with associated parameter of similar features (e.g., transitions (T), effects (E), and titles (TI). In particular, FIG. 3A illustrates a method of linking features, such as the transition features T1 to T7 in FIG. 2, according to various parameter values in each of the transition features. For example, a global linked list 302 links T1 to T7 according to their respective global sequence number 304 in the timeline. That is, the global sequence number is a number for each feature in the sequence regardless of its family or type. On the other hand, a family linked list 306 links a list of features according to the family number of each feature. For example, the family linked list 306 includes a separate list for each family of transitions: family 1 and family 2. As such, the family 1 list links to T3, T4 and T6. Similarly, the family 2 list links T1, T2, T5 and T7. In addition, according to the family linked list 306, each feature has a family local sequence number 308, and a family global sequence number 310.

An individual type linked list 312 links the features according to their individual type number within a particular family. For example, the individual type linked list 312 has an individual type 1 list containing features such as T3, T4, and T6 because they are of the type 1 in family 1. Similarly, an individual type 2 list contains type 2 features, such as T2 and T5 of family 2, and an individual type 3 list contains type 3 features, such as T1 and T7 of family 3. An individual type local sequence number 314 and an individual type global sequence 316 indicate the sequence of the features T1 to T7 according to the individual type linked list 312.

In one embodiment, the linked lists noted above in FIG. 3A are recalculated whenever a feature (e.g., effect, transition or title) is changed on the timeline (e.g., the timeline 202 in FIG. 2). For example, if the consumer edits the features in FIG. 2 by removing T3 and VC3+E3, the system 100 may recalculate all individual type linked lists that are affected by the change to the timeline. The sequence generator 106 recalculates the parameters for each feature on the timeline in response to any change. It also creates a list of all features whose parameters (e.g., the individual local sequence number and the individual global sequence number) have changed during the recalculation process. The system next recalculates all family linked lists that are affected by the change to the timeline and adds to the list of all features whose parameters (e.g., the family local sequence number and the family global sequence number) have changed. Before the rendering component 108 displays the features and the media objects, the sequence generator 106 recalculates the parameters for each of the affected features. As discussed earlier, some non-complex features may be processed in real time while some complex features may require pre-rendering or pre-calculation. As such, the rendering component 108 may recalculate and/or redraw the affected portion of the timeline immediately after a change has been notified to it by the sequence generator or at some later time.

FIG. 3B is another diagram illustrating determined parameter values of different types of features in different families in the sequence of media objects. In particular, FIG. 3B illustrates parameter values for the same individual type within the same family of transition (T) features. The number following "T" (e.g., "3" of T3) indicates the number of a transition in the overall sequence of transitions. For example, T3, T4, T6, T12, T13, T15, and T17 all belong to the same family and the same type (e.g., family 1, type 1). Transitions between these transitions belong to a different family, or a different type, or both. As such, according to the definitions of different parameter categories noted above, each transition feature (e.g., T3, T4, T6, T12, T13, T15, or T17) has parameter values corresponding to the position of the feature relative to other features.

FIG. 3C is a further diagram illustrating determined parameter values of different types of features in different families in the sequence of media objects. In particular, FIG. 3C illustrates transitions (e.g., T11 to T17) which are in an uninterrupted sequence. For example, the family global sequence number of T11 and T14 is 1 and 2, respectively, because they belong to the same family (e.g., family 2). Similarly, the family global sequence number of T12, T13, T15, T16 and T17 is 1, 2, 3, 4 and 5, respectively, because they belong to the same family (e.g., family 1). The individual global sequence number of T12, T13, T15 and T17 is 1, 2, 3 and 4, respectively, because they belong to the same family and the same type (e.g., family 1 and type 1).

Figure 4:
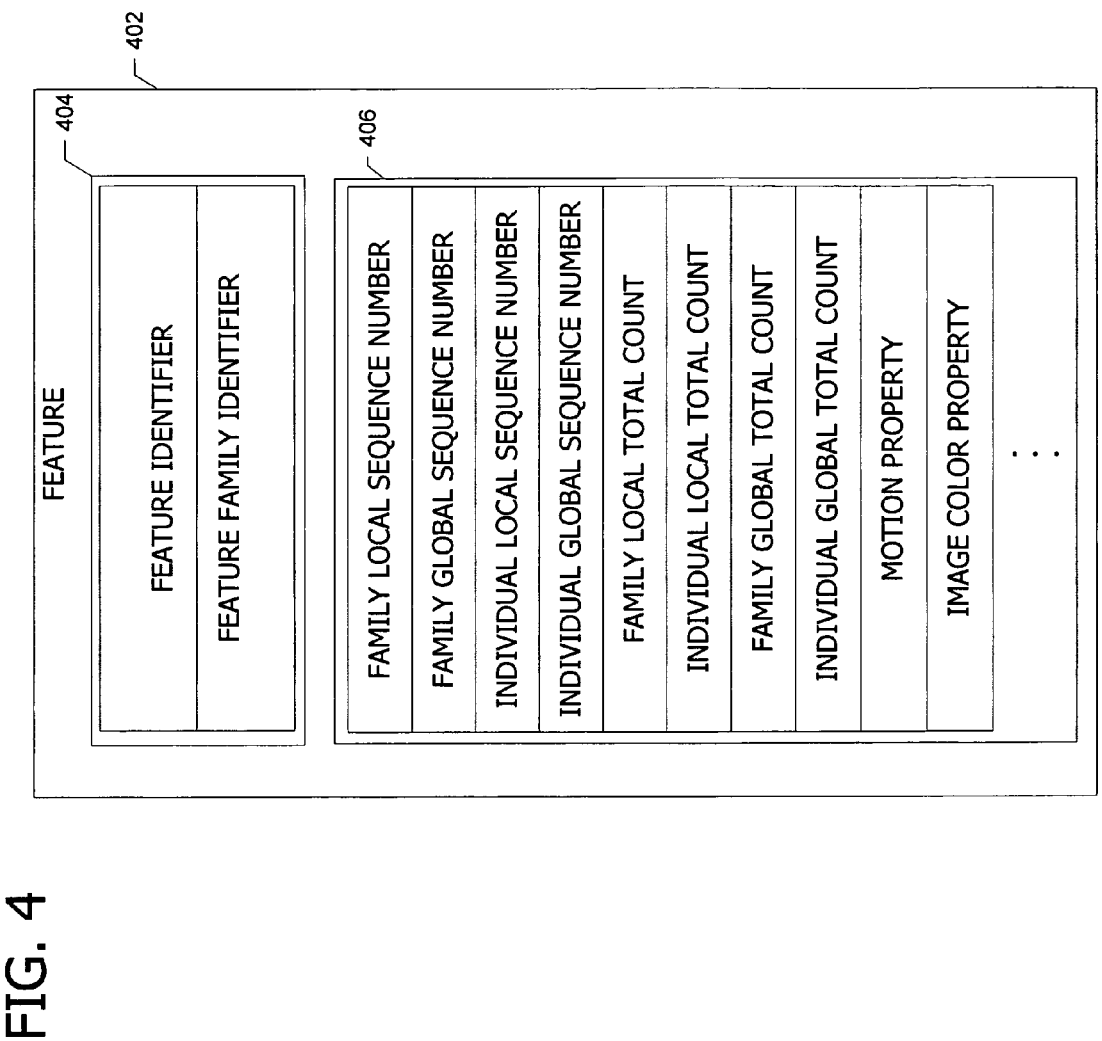
FIG. 4 is a block diagram illustrating a data structure for a feature to be associated with one or more of a plurality of media objects in a sequence according to the invention.

Referring next to FIG. 4, a block diagram illustrating a data structure for a feature to be associated with one or more of a plurality of media objects in a sequence according to the invention. The feature 402 has a first group of fields 404 including data identifying the feature 402. The data identifying the feature 402 may include fields for an identification number, a feature family number or other identification number that uniquely identifies each feature among other features. For example, a wipe transition feature may have an identification number of "1." The system 100 or a third party manufacturer of a feature 402 may have a universal identification system for assigning a unique identification number to all features. The first field 404 may include an identification number identifying a family of features containing one or more members. For example, a wipe transition feature family may have members such as a smooth wipe, a jugged-edge wipe, or the like.

Also, the data identifying the feature 402 may include a type number, or a type number identifying a manufacturer of the feature. For example, as in FIGS. 3B and 3C, a wipe transition feature may have different types of wipe transition such as a 2-D wipe, a 3-D wipe, organic wipe, or the like.

The feature 402 also comprises a second group of fields 406 storing a plurality of values representing the position of the feature relative to other features associated with the media objects in the sequence and/or other data calculated by the sequence generator. In one embodiment of the invention, the group of fields 406 holds all eight of the parameter values noted above. In another embodiment of the invention, the group of fields 406 also contains values representing information about the media objects around it, for example, data about the average brightness of the video clip preceding it and following it, or a complex set of motion vectors expressing the motion present in the video clip preceding it and following it (see discussion of FIG. 5D).

It is contemplated by the invention that the above data structure of the features may be adopted or implemented by a third party vendor, manufacturer, or designer of features which are compatible with the system 100. For example, a third party vendor of features may design a series of title features to be used with the system 100 for editing media objects. As such, the third party vendor of features would configure each of the features with the data structure illustrated in FIG. 4 such that the consumer may purchase the set of third party title features to be used with the system 100. In addition, one or more of the above mentioned parameters may also be implemented as part of the design or manufacturing of the features. For example, the third party vendor that designs the series of title features elects to incorporate the family global sequence number only.

Figure 5A:
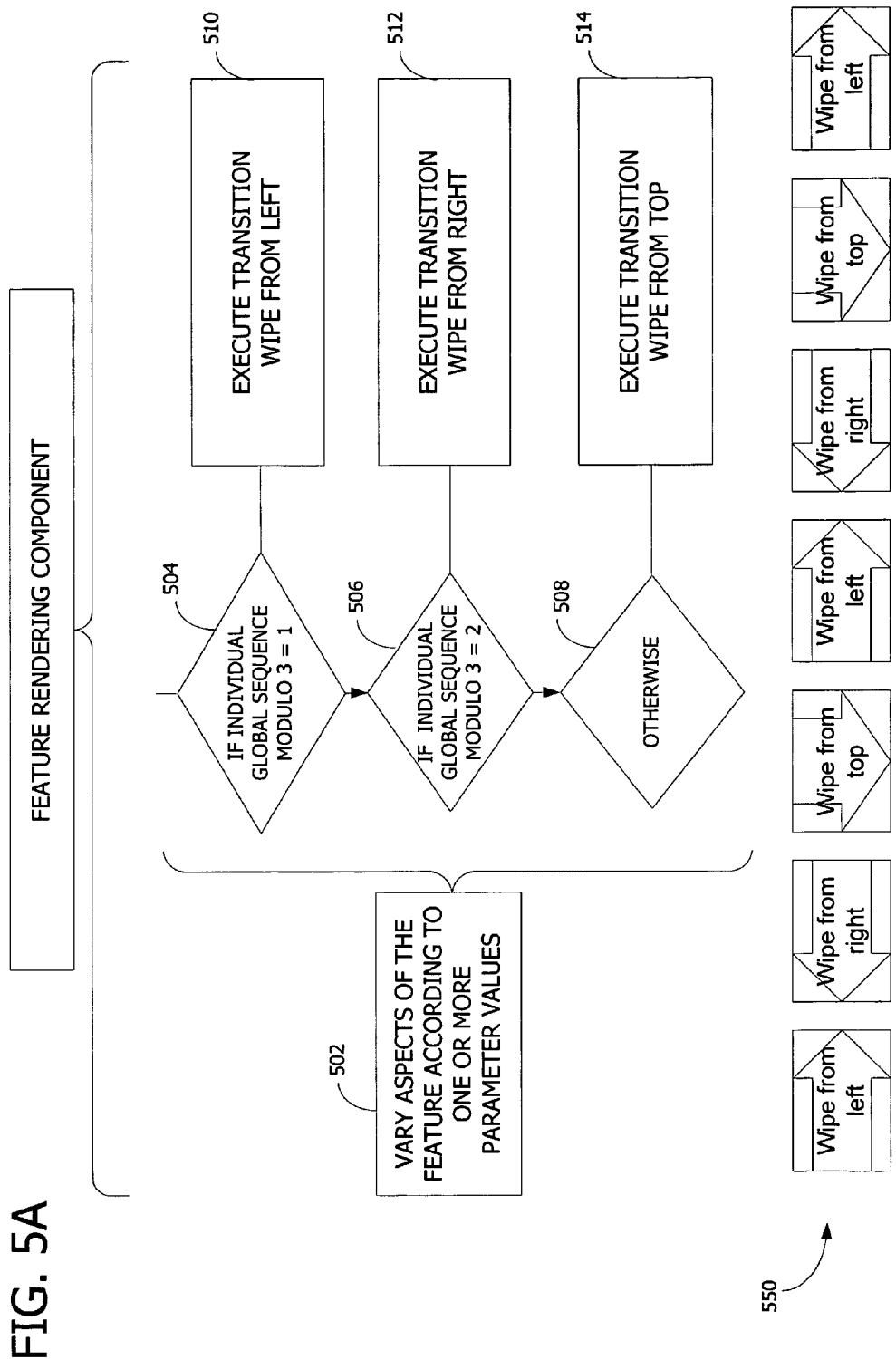
FIGS. 5A to 5D are flow charts illustrating varying aspects of a feature according to one or more parameter values.

FIG. 5A illustrates varying aspects of a feature according to the individual global sequence number. As discussed earlier, the sequence generator 106 modifies the parameters 406 within the feature according to its position on the timeline relative to other features and/or according to other contextual information such as the content of the media objects around it. At 502, these parameters 406 are passed to the feature rendering component which renders the feature according to some or all of these parameters. For example, the rendering component 108 varies the aspect of a wipe transition feature according to the values of the individual global sequence number in FIG. 5A. Suppose a consumer wants a wipe transition pattern of left-to-right, right-to-left and top-down, if the individual global sequence number of a wipe transition feature modulo 3 is equal to 1 at 504 (where modulo means the remainder in an integer division), the rendering component 108 renders a left-to-right wipe at 510. Similarly, if the individual global sequence number modulo 3 is equal to 2 at 506, the rendering component 108 renders a right-to-left wipe at 512. At 508, if the individual global sequence number modulo 3 is neither 1 nor 2, the rendering component 108 renders a top-down wipe at 514. As such, the consumer would see a consistent pattern of wipe transitions at 550.

Figure 5B:
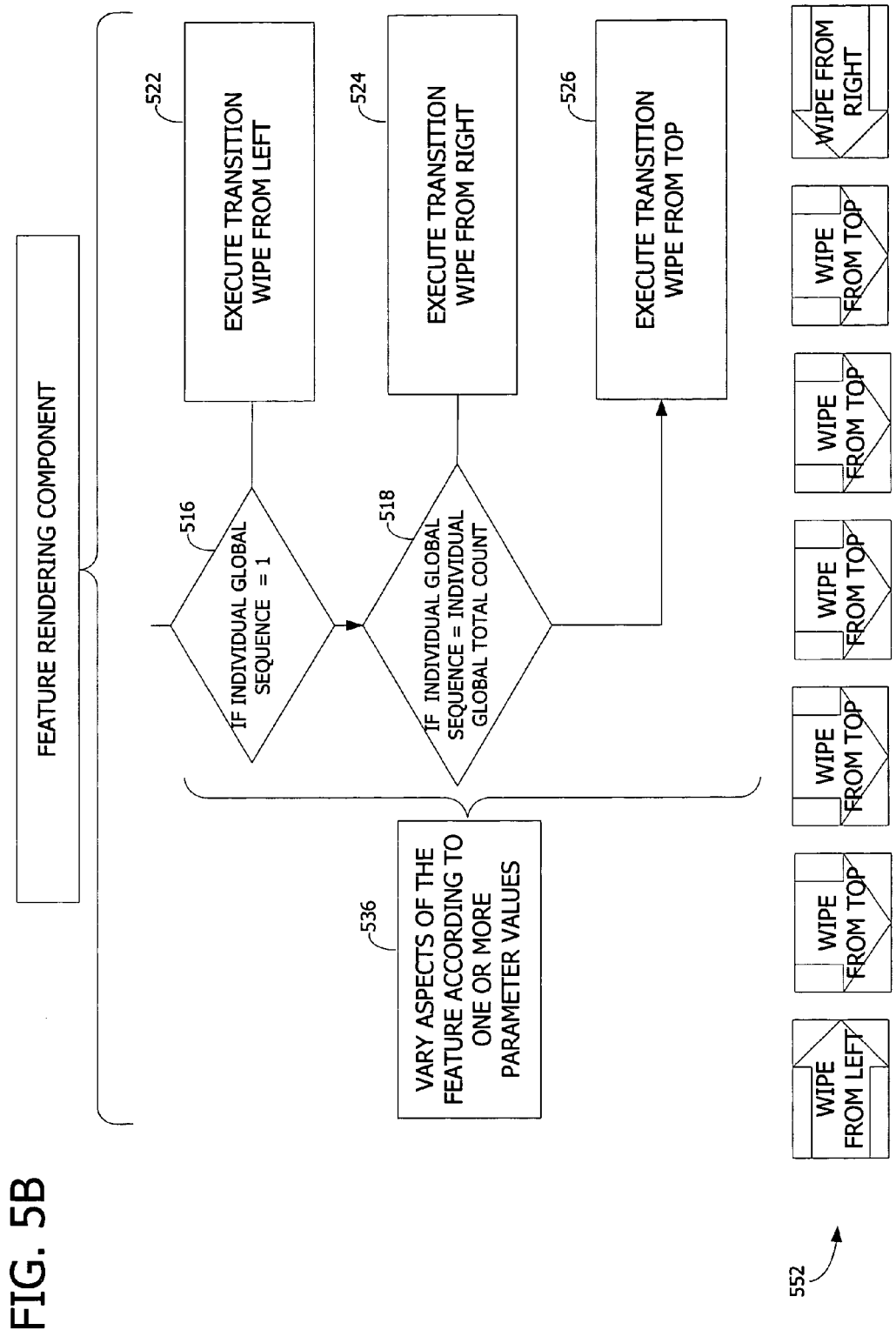

FIG. 5B illustrates varying aspects of a feature according to the individual global sequence number and the individual total count. As discussed earlier, the sequence generator 106 modifies the parameters 406 within the feature according to its position on the timeline relative to other features and/or according to other contextual information such as the content of the media objects around it. Suppose a consumer wants a wipe transition having a pattern of a left-to-right wipe at the beginning, a top-down wipe at the end and intermediate right-to-left wipes. In FIG. 5B, the rendering component 108 determines at 516 if the individual global sequence number of a wipe transition feature is equal to one. If it is, the rendering component 108 renders a left-to-right wipe at 522. At 518, the rendering component 108 determines if the individual global sequence number is equal to the individual global total count meaning it is the last wipe transition. If the determination is positive, the rendering component 108 renders a right-to-left wipe at 524. Otherwise, the rendering component 108 renders a top-down wipe at 526. Hence, the consumer would view a pattern of wipe transitions at 552.

Figure 5C:
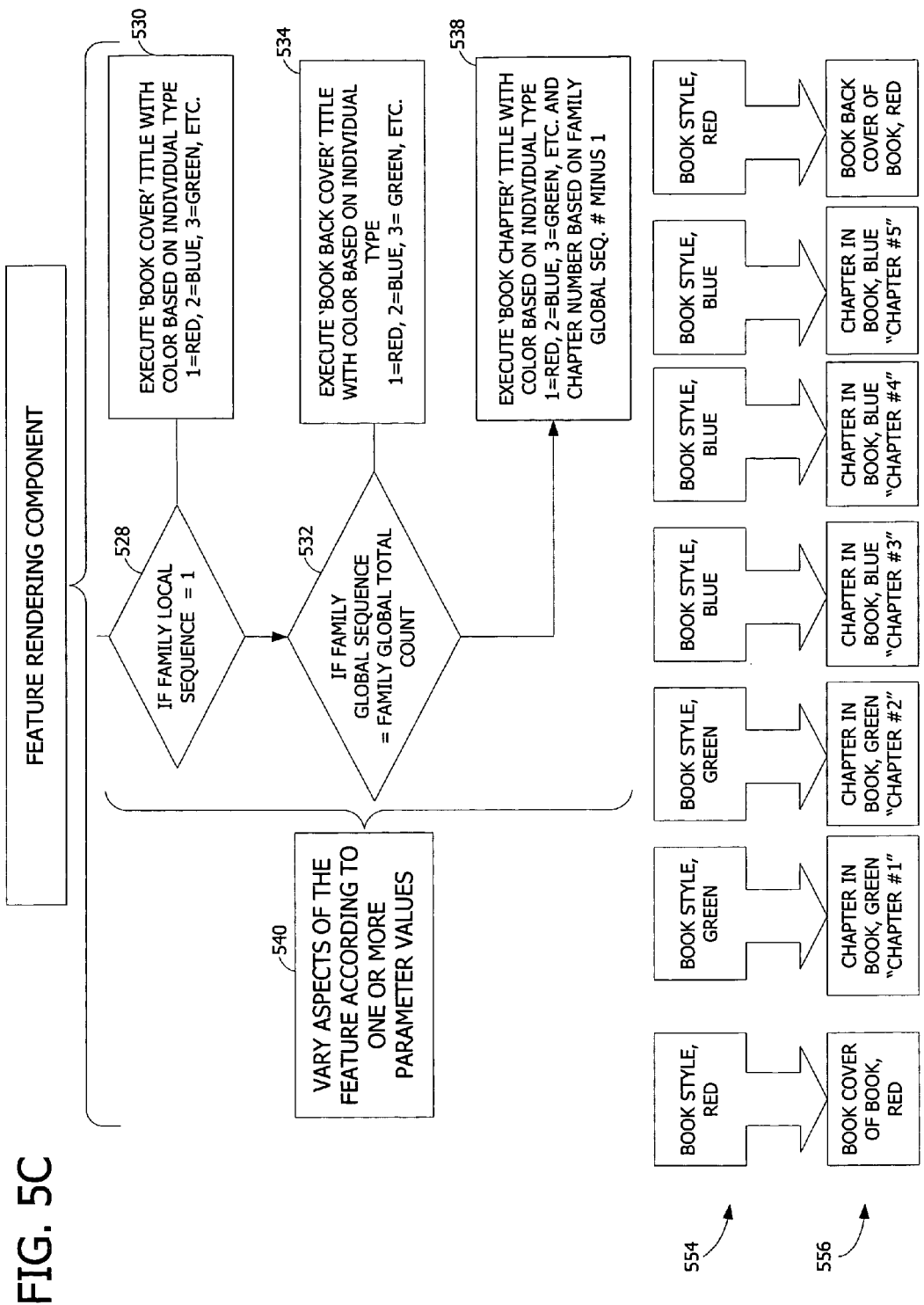

FIG. 5C illustrates varying aspects of a feature according to the family global sequence number and the family global total count. As discussed earlier, the sequence generator 106 modifies the parameters 406 within the feature according to its position on the timeline relative to other features and according to other contextual information such as the content of the media objects around it. Suppose a consumer wants a title feature that organizes the media objects like a book with a front cover, a back cover, and intermediate chapter titles. The rendering component 108 determines if the family local sequence number of a title feature is equal to 1 at 528. If the family local sequence number is equal to 1, the rendering component 108 executes a "book cover" title with color based on an individual type at 530. In FIG. 5C, there are three types of title features in the color title family; 1=a red color book style, 2=a blue color book style, and 3=a green color book style. As the sequence generator 106 determines the family global sequence number and the family global total count, these values are used by the rendering component 108 to create different aspects of a title (e.g., book front cover, book back cover, or intermediate chapter). At 530 the rendering component 108 executes the aspect ("book cover" title) if the family global sequence number is '1', i.e. this is the first occurrence of this family of titles on the timeline. At 532, the rendering component 108 compares the family global sequence number to the family global total count. If they are the same, the rendering component 108 executes the "book back cover" title aspect to each type of title feature within the color title family at 534, meaning it is the last color title. If the determination at 532 is negative, the rendering component 108 executes the "book chapter" aspect to each type of title within the colored title family at 538. Overall, the consumer would see the result of the features rendered by the rendering component 108 at 556 with the three types of title features 554.

Figure 5D:
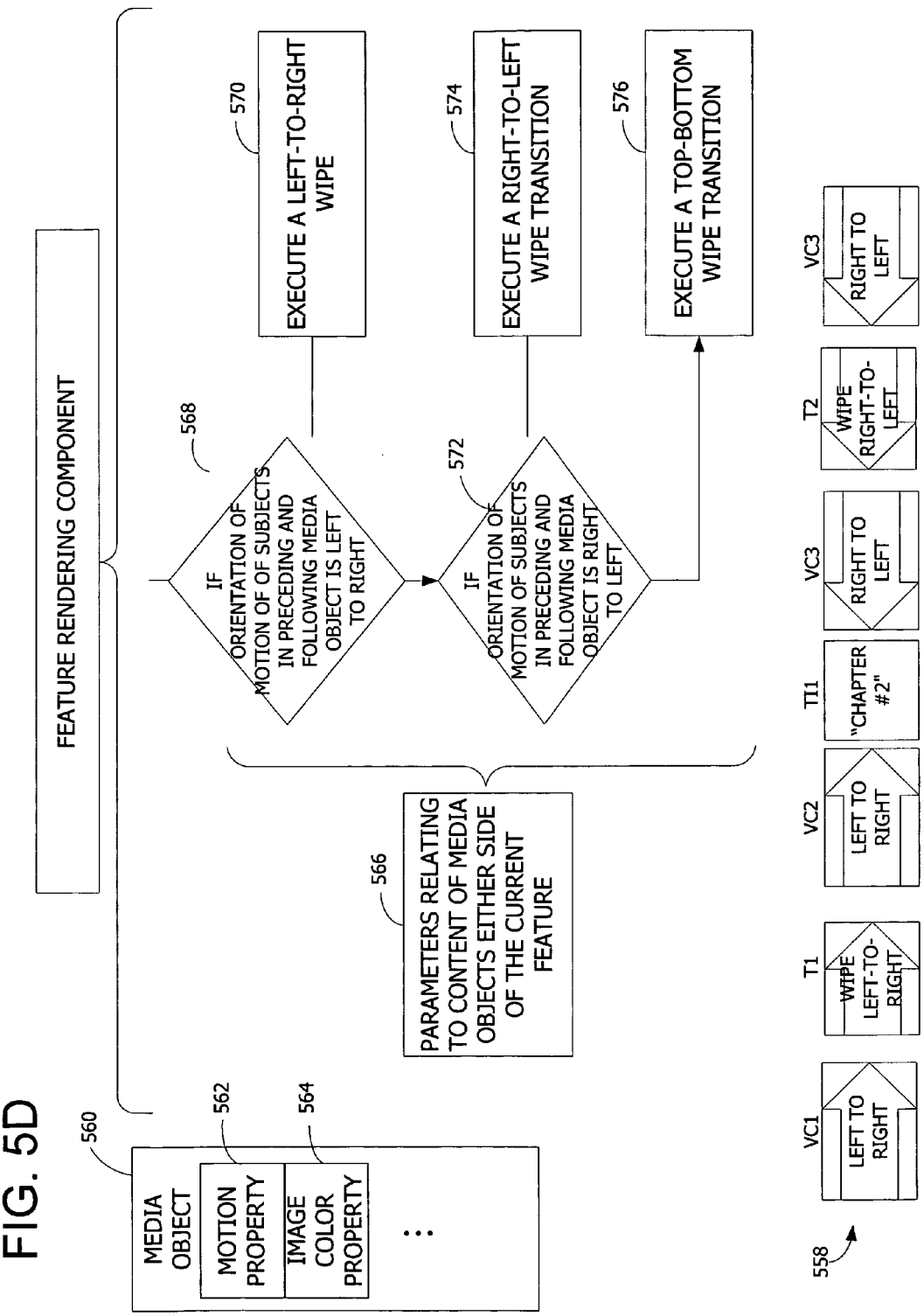

In another embodiment, FIG. 5D illustrates varying aspects of a feature according to parameters derived from related media objects. A media object (e.g., a video clip) 560 may possess actual or derived properties. Actual properties of a media object may include, without limitation, the duration of the media object and, in the case of a video clip or still image, the date and time at which the video or image was recorded. Derived properties of a media object may include, without limitation, properties such as motion properties 562, image color properties 564, and/or other properties. Motion properties 562 may include properties, such as derived or actual camera velocity in the x-axis, derived or actual camera velocity in the y-axis, derived or actual camera velocity in the z-axis, derived or actual subject velocity in the x-axis, derived or actual subject velocity in the y-axis, derived or actual subject velocity in the z-axis, camera steadiness, derived or actual camera zoom velocity, or other properties relating to a motion vector. Image color properties 564 may include parameters, such as a dominant color in a media object and a frequency of other colors within a media object, or other parameters relating to a color histogram. The media object 560 may also include parameter such as the duration of the media object 560, camera settings, global position satellite (GPS) information, or other actual or derived data. The sequence generator 108 copies these parameters from the media objects surrounding a feature into fields (e.g., the group of fields 406) within the feature for a predetermined number of media objects before or after the current feature. For example, in one embodiment of the invention, the sequence generator 106 copies the subject motion vectors for the preceding and following media objects into the current feature. In another embodiment of the invention, the sequence generator 106 copies the subject motion vectors for the five preceding and five subsequent media objects into the current feature. With these parameters as input at 566, the rendering component 108 in this example determines if the orientation of motion of the subjects in the media objects on either side of the feature being rendered (e.g., VC1 and VC2) is from left to right at 568. If the determination is positive, the rendering component 108 executes a left-to-right wipe transition (e.g., T1) between VC1 and VC2 at 570. At 572, if the sequence generator 106 determines the orientation of motion of the subjects in the adjacent media objects is from right to left, the rendering component 108 executes a right-to-left wipe transition between the media objects at 574. Otherwise, the rendering component 108 executes a top-bottom transition at 576. Overall, the consumer would see the result of the modified features by the sequence generator 106 at 558. The overall effect in this case would be for the transition to align itself with the horizontal motion of the subjects in the media clips it is transitioning between, or where there is no coherent horizontal motion to perform a vertical wipe.

In other words, the rendering component 108 can vary the aspects of a feature by analyzing parameters relating to the content of media objects.

As illustrated in FIGS. 5A to 5D, the system 100 may be implemented by using one or more combination of parameter values noted above to achieve desired results.

It is contemplated that any permutation and/or manipulation of one or more parameter values does not depart from the spirit of the invention. For example, a third party vendor of features may use the individual local sequence number and the individual global total count in varying aspects of a fade transition while another third party vendor of features may use the family global sequence number and the family global total count for a pause feature, or the like.

In one embodiment, the features include a predetermined set of rules for varying aspects of the feature. For example, the third party vendor of features, in the process of designing features, may configure the features such that the aspects of the features are determined by one or more parameter values noted above. It is contemplated that the rendering component 108 may not use all identified data or values (e.g., parameter values) in determining how to render the feature. A typical rendering component will use only a small number of the many possible parameters. Some rendering components will use a selection of the sequence-based parameters, others will use parameters derived from adjacent media objects, and others may use a mixture of these two types of parameters.

In another example, another third party vendor of features may use parameters relating to the content of media objects and/or parameter values noted above in varying aspects of features. In yet another embodiment, the features present options to the consumer to override the automatic behavior and to select a particular pattern of how aspects of a feature should vary. For example, the consumer may select a pattern for a wipe feature, such as left-to-right, right-to-left, or the like. Such user interaction may create yet another parameter which can be passed to surrounding features so that they can automatically adjust to accommodate the user's choice. For example, if the user forces a wipe to be left-to-right, the remaining wipes may automatically adjust to start a new sequence beginning with a right-to-left wipe. In yet another embodiment, a third party vendor predefines a set pattern for a feature.

Figure 6:
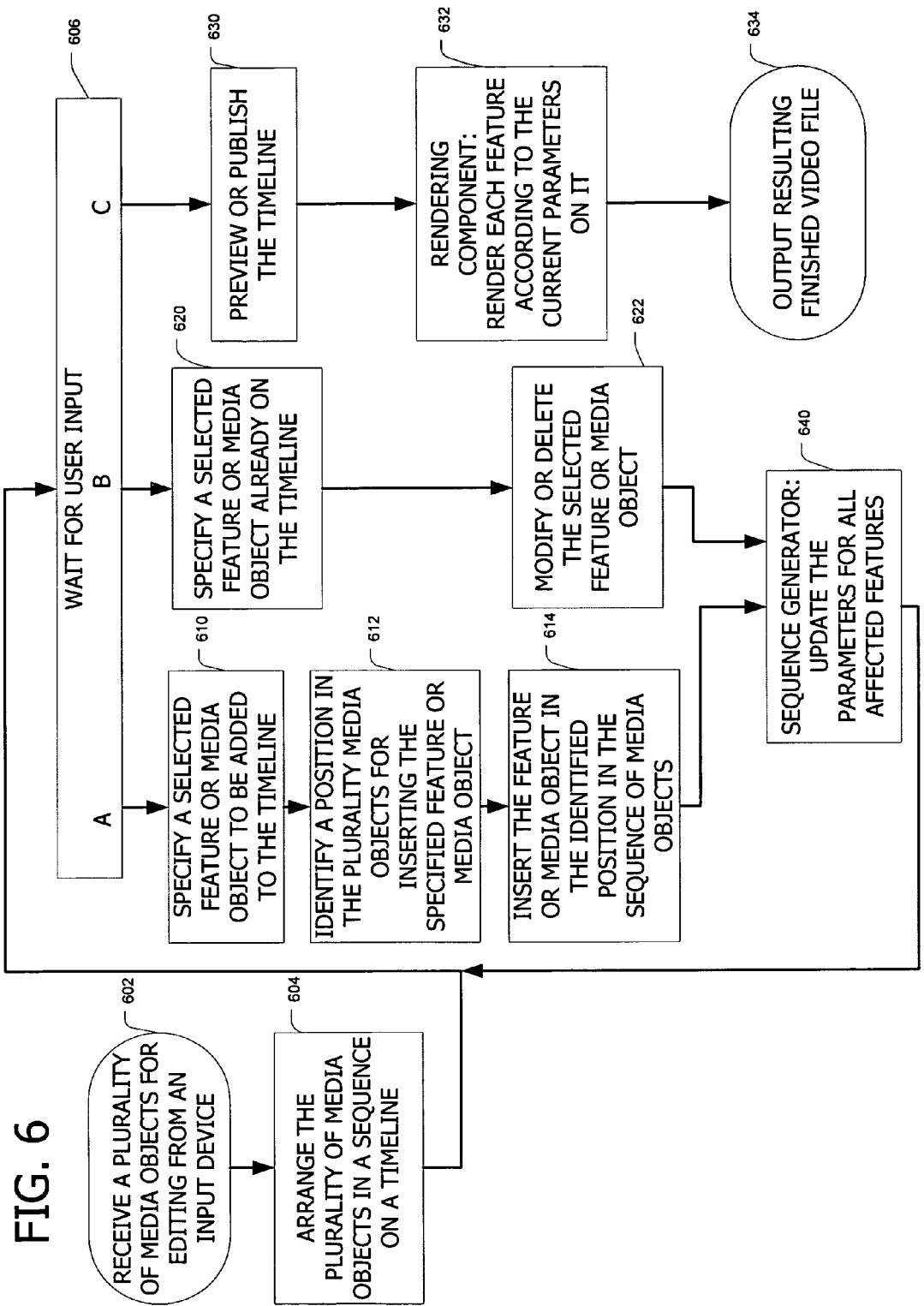
FIG. 6 is a flow chart illustrating a method of applying a feature with a plurality of media objects in a sequence according to the invention.

Referring to FIG. 6, a flow chart illustrates a method of applying a feature with a plurality of media objects in a sequence according to the invention. At 602, the system 100 receives a plurality of media objects and arranges them to form a timeline or a sequence at 604. The consumer inputs a plurality of media objects using an input device (e.g., a digital camera or digital camcorder). The system 100 may also receive a plurality of media objects from other storage devices or computer-readable media.

At 606, the system 100 waits for a user input. At this point the user may request the system to perform one or more tasks including, without limitation, the tasks shown as A, B and C. For example, A is for adding feature or more media objects to the timeline. B is for modifying or deleting existing features or media objects on the timeline. C is for previewing or publishing the finished video from the timeline. The system 100 receives the user's input/selection of these tasks via an input device, such as a mouse. In another embodiment, one or more tasks are automatically completed in response to the user selection of A, B, and/or C. For example, as a user adds a complex feature (e.g., a 3-D transition), the system 100 substantially immediately may pre-render the 3-D transition feature.

At 610, the consumer uses the system 100 to specify a selected feature or media object to be added to the timeline in the sequence at 604. For example, the consumer selects one or more features in a collection of features supplied by the system 100 or by a third party manufacturer/vendor of the features (e.g., from 110 in FIG. 1A or from 204 in FIG. 2). The consumer may also purchase additional features from a third party vendor by downloading or installing the purchased features to the collection of features. It is contemplated that these third party manufactured features are designed and configured to be compatible with the system 100, and/or all of the components, modules, data structures, parameter settings, and other settings therein.

At 612, the system 100 identifies a position in the plurality of media objects for inserting the specified feature or additional media object, such as the consumer drags-and-drops the selected feature on the timeline (see FIGS. 1B and 1C). Each of the features comprises at least one variable aspect or property, such as directions of a wipe transition. As such, the system 100 renders the feature in various ways as a function of the identified position of the feature relative to the media objects and/or relative to other features in the sequence at 632. For example, the system 100 varies aspects or properties of the feature by evaluating one or more parameter values (as discussed in FIGS. 5A to 5D). At 614, the system 100 inserts the modified feature in the identified position in the sequence of media objects for display. At 640, the sequence generator updates the parameters on all the features that have been affected by the feature or media object added to the timeline at 614.

At 606, the consumer can also decide to modify or delete an existing media object or feature on the timeline. The consumer selects the feature or media object at 620, and s/he chooses to delete or modify the selected feature or media object at 622. As soon as the consumer has finished deleting or modifying the feature or media object, the sequence generator 106 updates the parameters for all affected features on the timeline at 640.

At 630, the consumer decides to preview or publish the timeline after selecting task C at 606. At 632, the system 100 uses the rendering component 108 to render each feature according to the parameters set on the features at 640. At 634, the finished video is written to an output file or other medium.

The present invention may be implemented by a software program editing one or more media objects that embodies at least some of the features of the invention. In operation, the system 100 may be a software program, code or a set of computer-executable instructions that are capable of editing media objects. Initially, a set of media objects is available for editing, such as a number of video clips or images. The feature component 102 specifies a feature from a collection of one or more features. The consumer assists in identifying the feature (e.g., by using a mouse clicking on the feature on a display), such as a wipe transition feature. The consumer also associates the identified feature to the media objects by using a mouse pointer to drag the identified feature (e.g., an icon representing the identified feature) to the identified position in the sequence of media objects. In other words, the consumer edits the video clips by specifying a position to insert a wipe transition feature, such as between 118-1 and 118-2 in FIG. 1B or inserting a title feature before the media object 118-2 or 118-4 in FIG. 1C.

The sequence generator 106 thereafter modifies the feature by setting various parameters of the feature as a function of the position of the feature relative to the media objects and/or relative to other features in the sequence. Thereafter the rendering component 108 renders the feature as a function of one or more of the parameters set on it For example, the rendering component 108 renders various wipe transitions or title styles for the feature as a function of the position and/or content of the feature relative to the media objects and/or other features in the sequence (see FIGS. 5A to 5D). By implementing one or more features of the invention, the consumer need not modify the feature to maintain a pattern as the sequence generator 106 automatically modifies the parameters of the feature as a function of the position of the feature relative to the media objects or other features in the sequence and the rendering component 108 automatically renders the feature as a function of those parameters.

After the consumer completes editing the media objects, the sequence generator 106 modifies the parameters for all features affected by the editing carried out by the consumer. When the consumer requests that the timeline be previewed or published, the rendering component 108 renders the feature according to the parameters set on it by the sequence generator 106. In one embodiment of the invention, the rendering component 108 may pre-render some complex features as soon as the sequence generator 106 modifies the parameters on them instead of waiting for the preview or publish component of the system 100 to call upon the rendering component 108.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer storage medium having computer-executable components included in a software program for creating features for use with a plurality of media objects in a sequence, said computer storage medium being executable by a processor of a computing device, said computer storage medium comprising:

a feature component specifying a type of features having parameters affecting at least one variable aspect of the type of features, said specified type of features being dynamically modifiable by the parameters thereof;

in response to receiving a user instruction, an indicator component for identifying a plurality of positions of instances the specified type of features to be inserted in the sequence relative to the plurality of media objects in the sequence;

a sequence generator for dynamically modifying the instances of the specified features by varying the parameters thereof as a function of the identified plurality of positions of the instances of the specified type of features within the sequence relative to remaining instances of the specified type of features; and a rendering component for rendering the instances of the specified type of features according to the varied parameters of the specified type of features at the identified positions when the media objects are sequentially displayed.

2. The computer storage medium of claim 1 wherein the sequence generator modifies the specified type of features by varying its parameters of the instances thereof as a function of one or more of the following: a position of the specified feature within the sequence relative to the media objects, a position of the specified feature within the sequence relative to other features, the content of the media objects on either side of the media object in the sequence, and the content of the media objects.

3. The computer storage medium of claim 2 wherein the type of features comprises at least one of the following types: a transition applied between two of the plurality of media objects, an effect applied to one of the plurality of media object, a title created as one of the plurality of media object, and a title applied to one or more media objects.

4. The computer storage medium of claim 2 wherein the plurality of media objects comprises a plurality of at least one of the following: video clips, photographs, and images.

5. The computer storage medium of claim 2 wherein the type of features comprises one or more parameters that are used to determine how the type of features is rendered.

6. The computer storage medium of claim 5 wherein the parameters includes at least one of the following: family local sequence number, family global sequence number, individual local sequence number, individual global sequence number, family local total count, family global total count, individual local total count, individual global total count, motion properties of a media object, image color properties of a media object, a duration of a media object, camera settings of a media object, and GPS information of a media object.

7. The computer storage medium of claim 6 wherein the motion properties includes at least one of the following: camera velocity in the x-axis, camera velocity in the y-axis, camera velocity in the z-axis, subject velocity in the x-axis, subject velocity in the y-axis, subject velocity in the z-axis, camera steadiness, and camera zoom velocity.

8. The computer storage medium of claim 6 wherein the image color properties include at least one of the following: a dominant color in a media object, a frequency of other colors within a media object, and a color histogram of a media object.

9. The computer storage medium of claim 2 wherein the feature is part of a particular family of features.

10. The computer storage medium of claim 2 wherein each of the instances is part of a particular type of features.

11. A computer storage medium having computer-executable components stored thereon for applying one or more features to a plurality of media objects in a sequence, each of said features having at least one variable property, said components comprising:

in response to receiving a user instruction, an indicator component for identifying a specified one instance of the features in a plurality of positions in the sequence of the plurality of media objects, said identified instance of the features having parameters affecting at least one variable property, said identified instance of the features being dynamically modifiable by the parameters thereof;

a modification component for modifying the identified instance of the features by varying the parameters thereof as a function of the identified plurality of positions of the identified instance of the feature within the sequence relative to other instances of the features in the sequence; and a rendering component for rendering the instances of features according to the varied parameters of the specified of features at the identified positions when the media objects are sequentially displayed.

12. The computer-storage medium of claim 11 wherein the modification component modifies the instance of the features by varying its parameters as a function of one or more of the following: a position of the identified instance of the features within the sequence relative to the media objects, the content of the media objects on either side of the media object in the sequence, and the content of the media objects.

13. The computer-storage medium of claim 12 wherein one or more features comprises at least one of the following types: a transition applied between two of the plurality of media objects, an effect applied to one of the plurality of media object, a title created as one of the plurality of media object, and a title applied to one or more media objects.

14. The computer-storage medium of claim 12 wherein the plurality of media objects comprises a plurality of at least one of the following: video clips, photographs, and images.

15. The computer-storage medium of claim 13 wherein the parameters include at least one of the following: family local sequence number, family global sequence number, individual local sequence number, individual global sequence number, family local total count, family global total count, individual local total count, individual global total count, a duration of a media object, camera settings of a media object, GPS information of a media object, camera velocity in the x-axis, camera velocity in the y-axis, camera velocity in the z-axis, subject velocity in the x-axis, subject velocity in the y-axis, subject velocity in the z-axis, camera steadiness of a media object, camera zoom velocity of a media object, a dominant color in a media object, a frequency of other colors within a media object, and a color histogram of a media object.

16. The computer-storage medium of claim 12 wherein the identified instance of the features is part of a particular family of features.

17. The computer-storage medium of claim 12 wherein the identified instance of the features is part of a particular type of features.

18. The computer-storage medium of claim 11 further comprising a rendering component for rendering the feature according to the modified parameters of the identified instance of the features at the identified position.

19. The computer-storage medium of claim 18 wherein the feature comprises one or more varying parameters that are used to determine how the feature is rendered.

20. A computerized method for creating features for use with a plurality of media objects in a sequence, said method comprising:

specifying a type of features having parameters affecting at least one variable aspect of the feature, said specified type of the features being dynamically modifiable by the parameters thereof;

receiving a user instruction for positioning a plurality of instances the specified type of the features in the sequence of the plurality of media objects;

in response to the received user instruction, identifying a plurality of positions of the plurality of instances of the specified type of the features to be inserted in the sequence of the plurality of media objects relative to the plurality of media objects in the sequence;

dynamically modifying the plurality of instances of the specified type of the features by varying the parameters thereof as a function of the identified plurality of positions of the plurality of instances of the specified type of the features within the sequence relative to instances of other type of the features; and rendering the specified feature according to the varied parameters of the specified feature at the identified positions when the media objects are sequentially displayed, said computerized method being executable by a processor of a computing device.

21. The computerized method of claim 20 comprising modifying the plurality of instances of the specified feature by varying its parameters as a function of one or more of the following: a position of the plurality of instances of the specified features within the sequence relative to the media objects, the content of the media objects on either side of the plurality of instances of the specified feature in the sequence, and the content of the media objects.

22. The computerized method of claim 21 wherein the feature comprises at least one of the following types: a transition applied between two of the media objects, an effect applied on a media object, a title created as a media object, and a title applied to one or more media objects.

23. The computerized method of claim 21 wherein the plurality of media objects comprises a plurality of at least one of the following: video clips, photographs, and images.

24. The computerized method of claim 21 wherein the parameter includes at least one of the following: family local sequence number, family global sequence number, individual local sequence number, individual global sequence number, family local total count, family global total count, individual local total count, and individual global total count, a duration of a media object, camera settings of a media object, GPS information of a media object, camera velocity in the x-axis, camera velocity in the y-axis, camera velocity in the z-axis, subject velocity in the x-axis, subject velocity in the y-axis, subject velocity in the z-axis, camera steadiness, camera zoom velocity, a dominant color in a media object, a frequency of other colors within a media object, and a color histogram of a media object.

25. The computerized method of claim 21 wherein the feature is part of a particular family of features.

26. The computerized method of claim 21 wherein each feature is part of a particular type of features.

27. A computer storage medium having computer-executable instructions for performing the method recited in claim 20.

28. A computer storage medium having computer-executable components included in a software program for creating features for use with a plurality of media objects in a sequence, said computer storage medium being executable by a processor of a computing device, said computer storage medium comprising:

a feature component specifying a feature having parameters affecting at least one variable aspect of the feature, said specified feature being dynamically modifiable by the parameters thereof;

in response to receiving a user instruction, an indicator component for identifying a plurality of positions of a plurality of instances of the specified feature to be inserted in the sequence of the plurality of media objects relative to the plurality of media objects in the sequence;

a sequence generator for dynamically modifying the plurality of instances of the specified feature by varying the parameters thereof as a function of other features in a family of features as the specified feature within the sequence; and a rendering component for rendering the specified feature according to the varied parameters of the specified feature at the identified positions when the media objects are sequentially displayed.

29. The computer storage medium of claim 28 wherein the sequence generator modifies the plurality of instances of the feature by varying its parameters as a function of one or more of the following: the content of the media objects on either side of the plurality of instances of the specified feature in the sequence, and the content of the media objects.

30. The computer storage medium of claim 29 wherein the parameters relating to the content of each of the plurality of media objects include one or more of the following: a duration of a media object, camera settings of a media object, GPS information of a media object, camera velocity in the x-axis, camera velocity in the y-axis, camera velocity in the z-axis, subject velocity in the x-axis, subject velocity in the y-axis, subject velocity in the z-axis, camera steadiness, camera zoom velocity, a dominant color in a media object, a frequency of other colors within a media object, and a color histogram of a media object.

31. The computer storage medium of claim 29 wherein the feature comprises at least one of the following types: a transition applied between two of the media objects, an effect applied on a media object, a title created as a media object, and a title applied to one or more media objects.

32. The computer storage medium of claim 29 wherein the plurality of media objects comprises a plurality of at least one of the following: video clips, photographs, and images.

33. The computer storage medium of claim 29 wherein the feature is part of one of the following: a particular family of features or a particular type of features.

34. The computer storage medium of claim 28 wherein the sequence generator further modifies the plurality of instances of the specified feature by varying its parameters as a function of one of the following: a position of the plurality of instances of the specified feature within the sequence relative to the media objects, a position of the plurality of instances of the specified feature within the sequence relative to other features.

35. The computer storage medium of claim 34 wherein the parameters relating to the position of the plurality of media objects include one or more of the following: family local sequence number, family global sequence number, individual local sequence number, individual global sequence number, family local total count, family global total count, individual local total count, and individual global total count.

* * * * *